Aug. 9, 1938.     O. H. HACKER     2,126,255
VEHICLE DRIVE
Filed June 14, 1935     2 Sheets-Sheet 1

Inventor
Oskar H. Hacker
by Karl Michaelis, Atty.

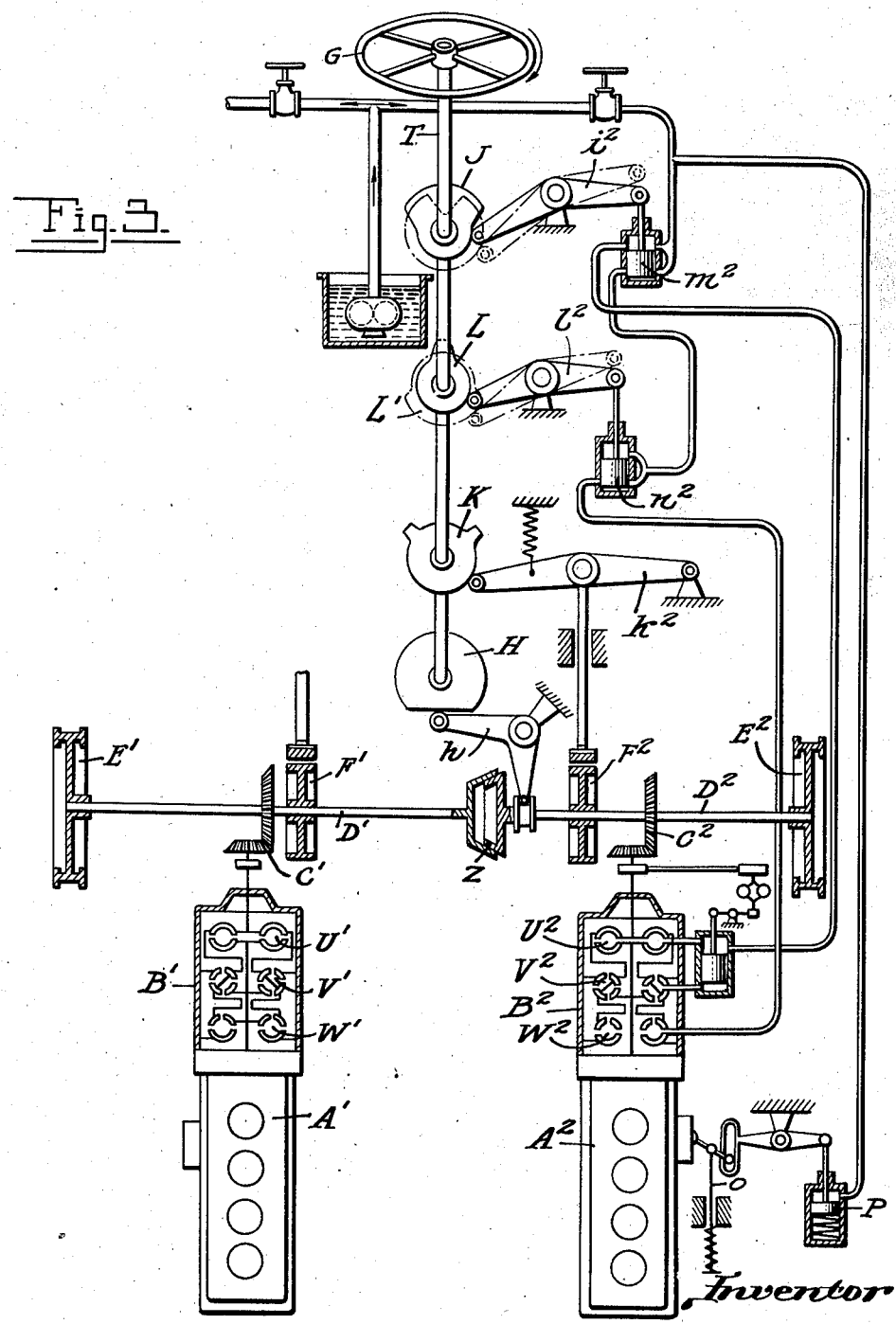

Patented Aug. 9, 1938

2,126,255

UNITED STATES PATENT OFFICE 2,126,255

VEHICLE DRIVE

Oskar H. Hacker, Steyr, Austria

Application June 14, 1935, Serial No. 26,654
In Germany June 15, 1934

4 Claims. (Cl. 180—9.2)

My invention relates to vehicle drives and more especially to mechanism for driving motor-driven vehicles of the multiple-wheel or Caterpillar types, i. e. vehicles comprising a number of wheels exceeding four, or comprising driven chains. It is an object of my invention to provide means whereby such vehicles can be propelled and their propulsion controlled in a particularly efficient manner so as to adapt their drive to the requirements of each individual case.

In connection with Caterpillar vehicles means have been provided for enabling the vehicle to travel in curves by driving the chains on either side of the vehicle at different rates. If it is a matter of sharp turns, the chain on one side can be stopped altogether, the vehicle being propelled with the other chain exclusively. Alternatively the chains on the two sides of the vehicles may be driven in opposite directions.

According to the present invention I improve the drive of multi-wheel or Caterpillar vehicles by inserting, between the motor or driving engine, and the wheels or chains, hydraulic driving gears, since such gears enable the wheels or chains to be thrown in and out, respectively, in a particularly simple and stageless manner by filling or emptying the hydraulic gear. I further provide for means for coupling and disengaging the gears on both sides of the vehicle, for braking each side separately to stop it and for driving each side independently in forward and rearward direction.

In the drawings affixed to this specification and forming part thereof, a vehicle drive embodying my invention is illustrated in a purely diagrammatic manner by way of example.

In the drawings

Fig. 3 is a perspective view of the steering wheel and pillar with the parts of the mechanism operated thereby.

Figure 1:
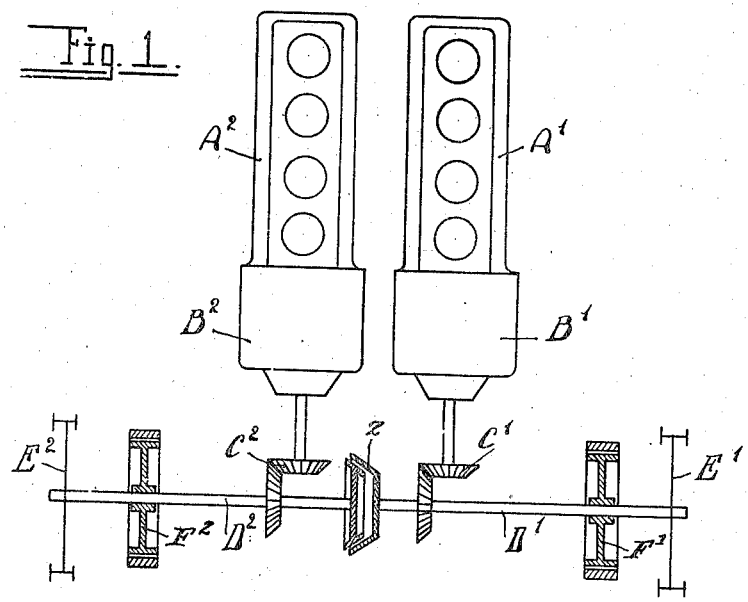
Fig. 1 is a plan view showing the driving gear and an engine and hydraulic gear for each side of the vehicle.

Referring to the drawings and first to Fig. 1, $A^1$ and $A^2$ are the two engines, one for the driving means (wheels or chains) on each side of the vehicle and $B^1$, $B^2$ are hydraulic turbine gears, each being coupled with and driven by one of the engines.

Obviously, the two turbine gears might as well be driven together by a single engine.

Each turbine gear comprises a hydraulic coupling $U^1$, $U^2$, a hydraulic torque transformer $V^1$, $V^2$ and a hydraulic reverse gear $W^1$, $W^2$.

Power is transmitted through the turbine gears $B^1$, $B^2$ and bevel gearing $C^1$, $C^2$ to the two separate driving shafts $D^1$, $D^2$, respectively, each of which carries the driving wheels or chains $E^1$, $E^2$, respectively. On each shaft is mounted a brake device $F^1$, $F^2$, respectively, for stopping either one or both shafts according to requirements. On each shaft is mounted one half of a friction clutch Z.

In order now that the propulsion of the vehicle can be controlled in accordance with all requirements, the steering devices for the several parts of the steering gear above described are so combined with each other, as will be explained more particularly hereinafter that on the steering wheel G (Fig. 2) being turned one way or the other, the individual phases of steering the vehicle are gone through in the following sequence:

When going ahead, the driving means on either side of the vehicle are running at the same speed and provided that both engines operate with the same number of revolutions, one of the hydrodynamic gears for going ahead on either side is filled with the same quantity of liquid. An equal speed of the driving gear on either side is secured as a rule by the clutch Z being thrown in so that both sides are also mechanically connected with each other. This is the case as long as the steering wheel occupies its normal position indicated by the straight arrow in Fig. 2.

If now the steering wheel is turned to the right or left through one half of the angle $g^1$, the clutch Z is disengaged and the two shafts $D^1$ and $D^2$ thus rendered independent of each other. On the steering wheel being turned further through the angle $g^2$ or $g^{2\prime}$, the turbine gear for going ahead of the driving gear on the side of the vehicle directed toward the inside of the curve will gradually be emptied of liquid and the driving gear on that side will consequently lag. If the vehicle shall be steered to the left, on the steering wheel G being turned further through the angle $g^3$, the brake $F^1$ will be operated, or, if the vehicle shall be steered to the right, the steering wheel G is turned through the angle $g^{3\prime}$ and the brake $F^2$ is operated. If the steering wheel G is turned through one half of the angle $g^4$, the reverse gear located at the inner side of the curve will be set operating. More especially, if the steering wheel G is turned through half the angle $g^4$ to the left, the left reverse gear and, if turning through the other half of $g^4$ to the right, the right reverse gear is operated.

Figure 2:
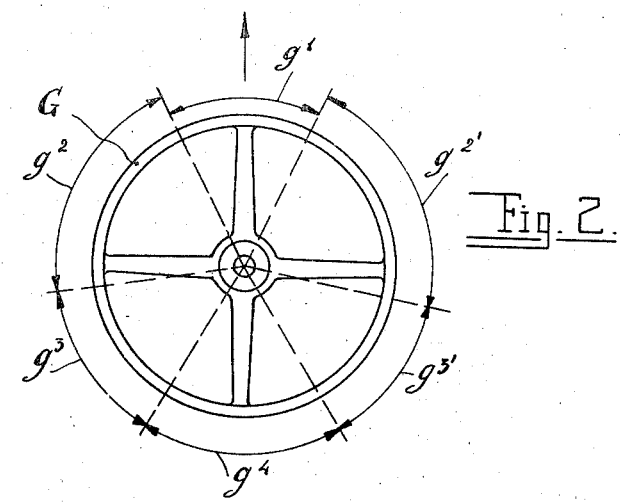
Fig. 2 is a diagram illustrating, under the form of a plan view of the steering wheel, the different zones of control of the driving mechanisms.

The consecutive throwing in of the several steering gears, as above described, may for instance be effected by means of cams mounted on the steering pillar, as shown by way of example in Fig. 3, where the steering wheel G is shown to be mounted on the steering pillar T. Of the parts cooperating with the various cams mounted on the steering pillar, only those correlated with engine A² are shown in this figure. A cam disc H mounted on the steering pillar cooperates with a double armed lever h for the throwing in or out of the clutch Z, when the steering wheel is turned through one half of the angle g¹ (Fig. 2). Another cam disc J cooperates with a lever i² for the operation of a valve m², when the steering wheel G is turned through the angle g²', to influence the hydrodynamic gear for going ahead correlated with engine A² in such manner that it is gradually emptied until the secondary member of this gear comes to a standstill.

A third cam disc K mounted on the steering pillar is relied upon to act, through a lever k², while the steering wheel is turned through the angle g³, onto the brake F² to throw it in, after the gear for going ahead on that side of the vehicle has come to a standstill, the brake being released again, if during the last phase of the steering process on this side of the vehicle the reverse gear shall come into action.

The cam disc L serves the purpose to fill the reversing member of the hydraulic gear, for example, by way of a lever l² and valve n².

Means are further provided for enabling the reverse mechanisms on the two sides of the vehicle to be utilized also for reversing the vehicle as a whole, while at the same time steering it in either direction through curves as described with reference to the angular movements of the steering wheel.

To this end a second cam disc L¹ is combined with the disc L for common displacement in such manner that either one or the other disc is moved into coaction with the lever l². The disc L¹ is identical in shape with disc J and it is therefore possible to so arrange the parts that the disc L¹ may be dispensed with altogether, its functions being taken charge of by the disc J. In this latter case, when throwing over from going ahead to reversing, the cam disc J would have to be disengaged automatically e. g. from the lever i², spring-acted or other means being provided for preventing re-filling of the hydraulic gear for going ahead.

If a separate cam disc L¹ is provided, the disc J is connected with the discs L, L¹, in such manner that whenever disc L¹ is thrown in, the disc J is thrown out, the hydraulic gear for going ahead being at the same time prevented from being refilled.

With an arrangement of this kind curves can be described and the vehicle turned about a stopped driving gear on one side also during reversal.

A sharp turning of the vehicle by reversing a driving gear on one side of the vehicle is not provided for, since a reversal of the vehicle does not occur frequently. It is moreover possible to effect a short turning by operating the entire driving mechanism for going ahead in the manner described above.

Obviously there is nothing in the way of providing also means for effecting sharp turns, when going backwards, by operating only the corresponding gear for going ahead.

As shown in Fig. 3, the invention further contemplates to provide a piston P which is controlled by the pressure of the liquid actuating the turbine gears and in turn controls the gas lever rod O in a manner such that when the correlated turbine gear is emptied and the pressure of the liquid drops correspondingly, the delivery of gas to the engine is discontinued so as to prevent racing of the engine.

I wish it to be understood that I do not desire to be limited to the exact details of construction shown and described for obvious modifications will occur to a person skilled in the art.

I claim:—

1. A vehicle drive particularly suitable for use in vehicles of the multiple-wheel and Caterpillar types, comprising separate propelling means provided on either side of the vehicle, two driving engines each arranged for driving one of said propelling means, a plurality of hydraulic turbine gears each arranged for transmitting power from one of said engines to the propelling means correlated therewith, a plurality of hydraulic reverse gears each arranged for acting on one of said propelling means, a plurality of brakes each arranged for acting independently on one of said propelling means, a clutch adapted to connect and disengage the propelling means on either side of the vehicle, a single steering means and means associated therewith and adapted, during rotation of said steering means through 180° in either direction from its medium position, to first disengage said clutch, to thereafter influence the hydraulic turbine gear corresponding to the direction of rotation of said steering means up to full stop of said gear, to then operate the corresponding brake and to finally disengage said brake and to throw in the corresponding reverse gear.

2. A vehicle drive according to claim 1, wherein the means associated with the steering means and adapted to successively influence the clutch, the forward gear, the brake and the reverse gear on either side of the vehicle, comprise a plurality of cam members mounted on said steering means.

3. A vehicle drive particularly suitable for use in vehicles of the multiple-wheel and Caterpillar types and including separate propelling means provided on either side of the vehicle, and two driving engines each arranged for driving one of said propelling means, comprising in combination two hydraulic turbine gears, each arranged for transmitting power from one of said engines to the propelling means correlated therewith, steering means, cam members associated with said steering means, and means for controlling said hydraulic turbine gears in dependency upon the position of at least one of said cam members, a clutch adapted to connect and disengage the propelling means on either side of the vehicle, and means for controlling said clutch in dependency upon the position of another one of said cam members.

4. A vehicle drive particularly suitable for use in vehicles of the multiple-wheel and Caterpillar types, and including separate propelling means provided on either side of the vehicle, and two driving engines each arranged for driving one of said propelling means, comprising in combination two hydraulic turbine gears, each arranged for transmitting power from one of said engines to the propelling means correlated therewith, steering means, cam members associated with said steering means, and means for controlling said hydraulic turbine gears in dependency upon the position of at least one of said cam members, two brakes each arranged for acting independently on one of said propelling means, and means for controlling said brakes in dependency upon the position of at least another one of said cam members.

OSKAR H. HACKER.